(No Model.) 4 Sheets—Sheet 1.

J. P. JAMISON.
Machine for Ornamenting Wood.

No. 242,934. Patented June 14, 1881.

Witnesses:
Charles Healey
Walter E. Lombard

Inventor:
John P. Jamison
by N. C. Lombard
Attorney.

(No Model.) 4 Sheets—Sheet 2.

J. P. JAMISON.
Machine for Ornamenting Wood.

No. 242,934. Patented June 14, 1881.

Witnesses:
Charles Hraley
Walter E. Lombard.

Inventor:
John P. Jamison
by N. C. Lombard
Attorney.

N. PETERS. Photo-Lithographer, Washington, D. C.

(No Model.) 4 Sheets—Sheet 3.

J. P. JAMISON.
Machine for Ornamenting Wood.

No. 242,934. Patented June 14, 1881.

Witnesses:
Charles N Ealey
Walter E. Lombard

Inventor:
John P. Jamison
by N. C. Lombard
Attorney.

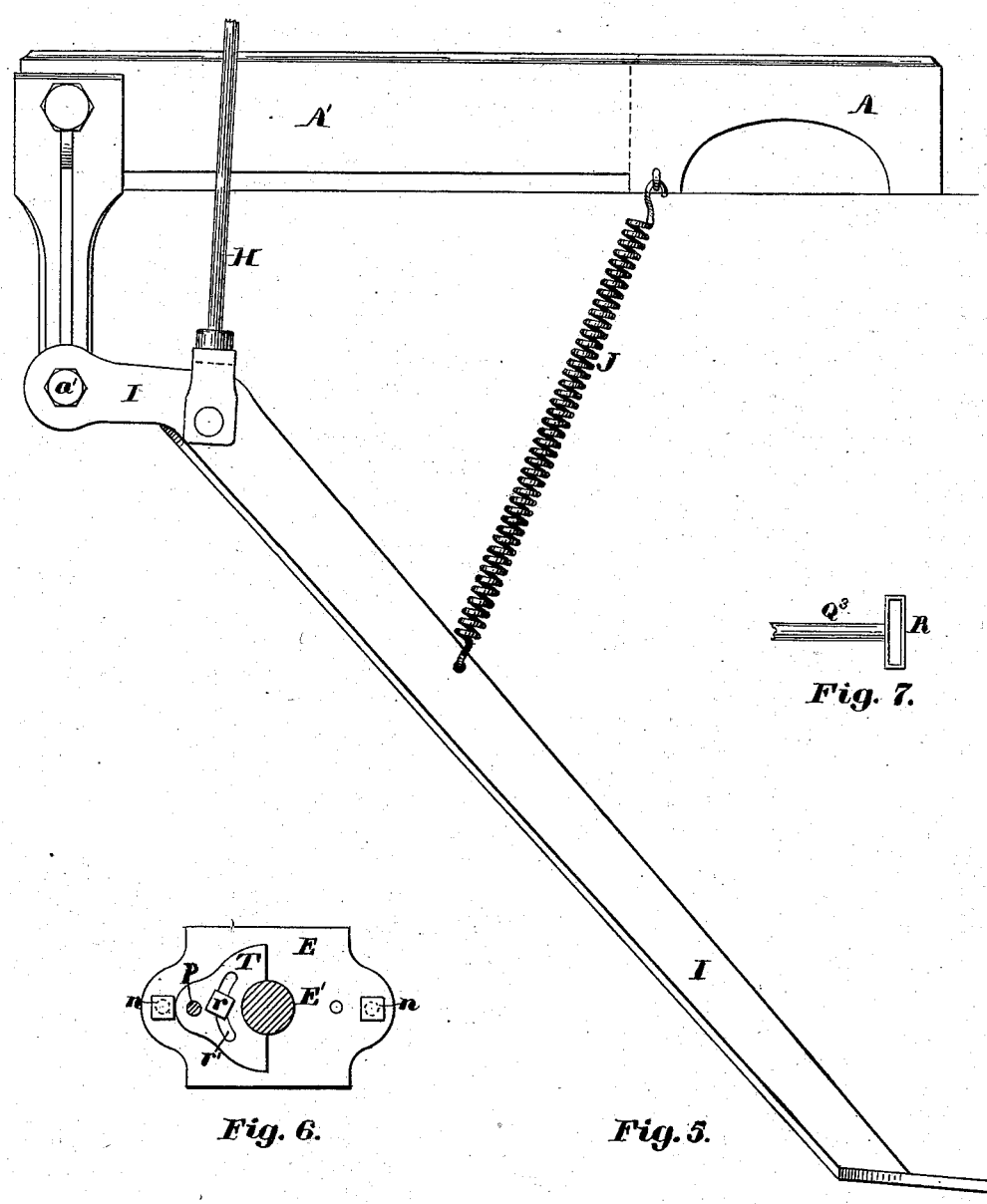

UNITED STATES PATENT OFFICE.

JOHN P. JAMISON, OF CAMBRIDGEPORT, MASSACHUSETTS.

MACHINE FOR ORNAMENTING WOOD.

SPECIFICATION forming part of Letters Patent No. 242,934, dated June 14, 1881.

Application filed May 2, 1881. (No model.)

*To all whom it may concern:*

Be it known that I, JOHN P. JAMISON, of Cambridgeport, in the county of Middlesex and State of Massachusetts, have invented certain new and useful Improvements in Machines for Ornamenting Wood, of which the following, taken in connection with the accompanying drawings, is a specification.

My invention relates to a machine for forming sunken designs in wood and other compressible material; and it consists in certain novel arrangements and combinations of parts whereby the cost of the machine is materially reduced and its operation simplified, all of which will be best understood by reference to the description of the drawings, and to the claims to be hereinafter given.

Figure 1:
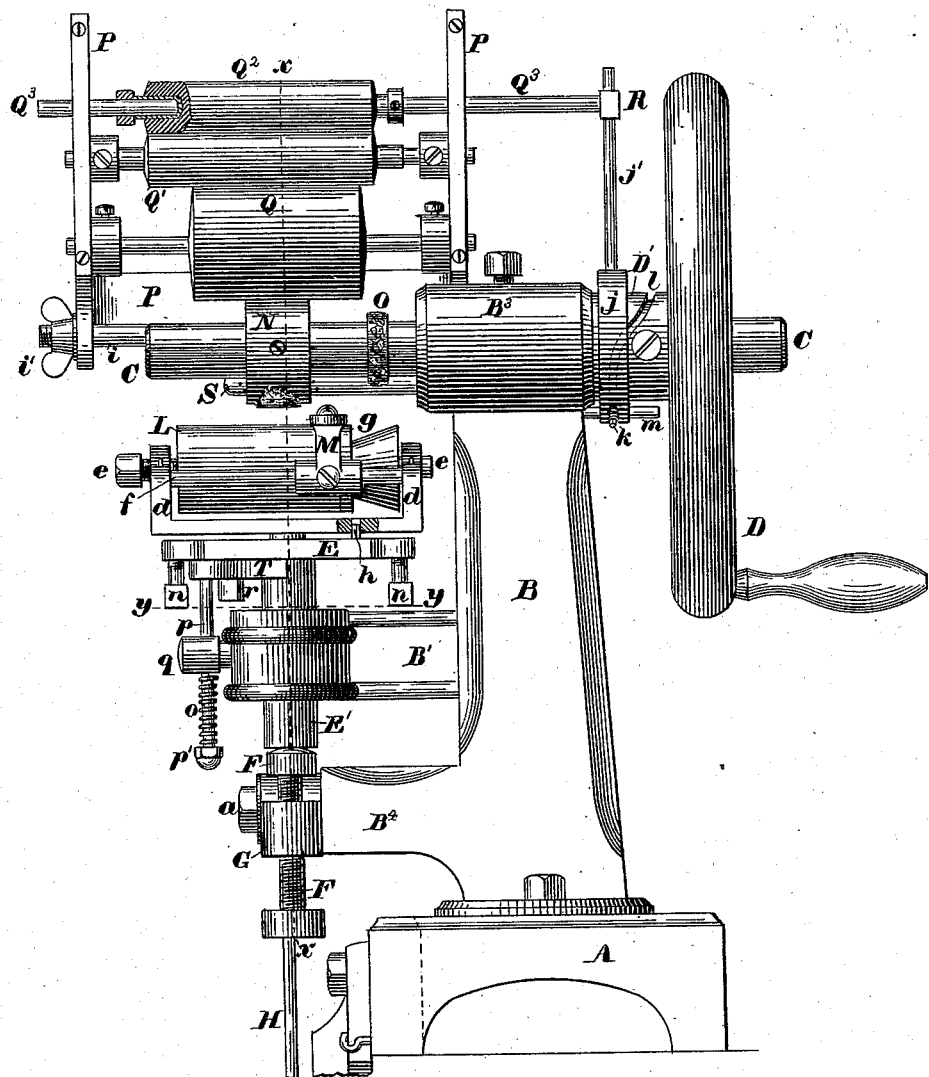
Figure 3:
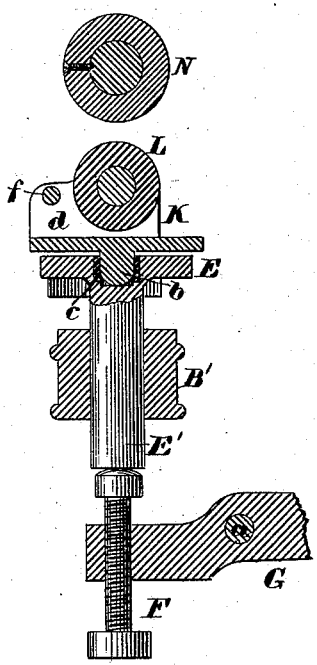
Figure 2:
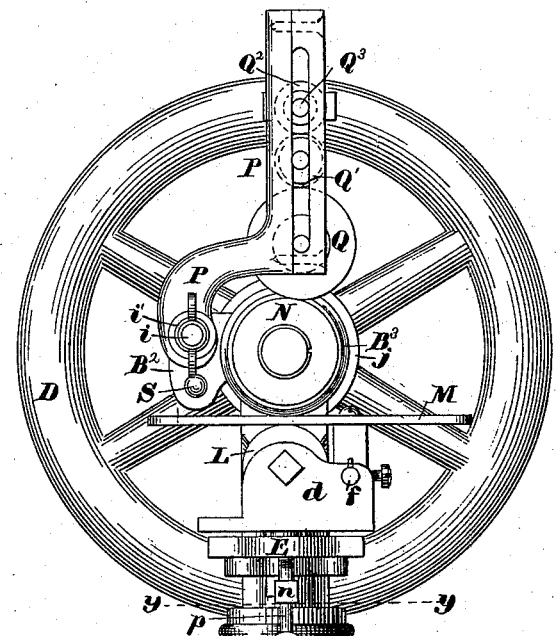
Figure 2:
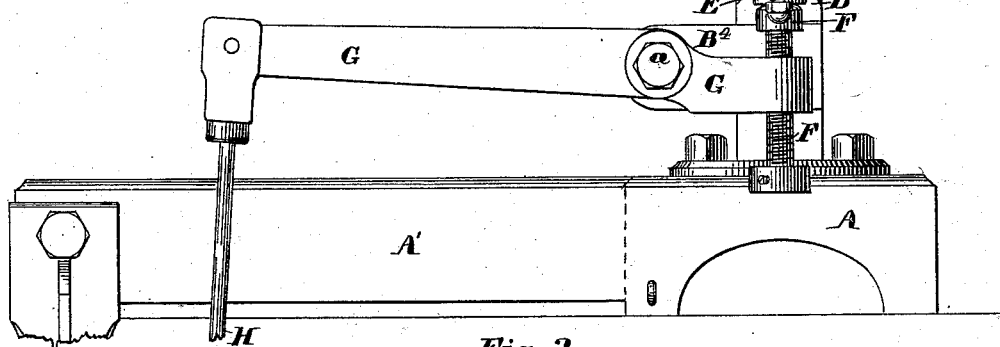
Figure 4:
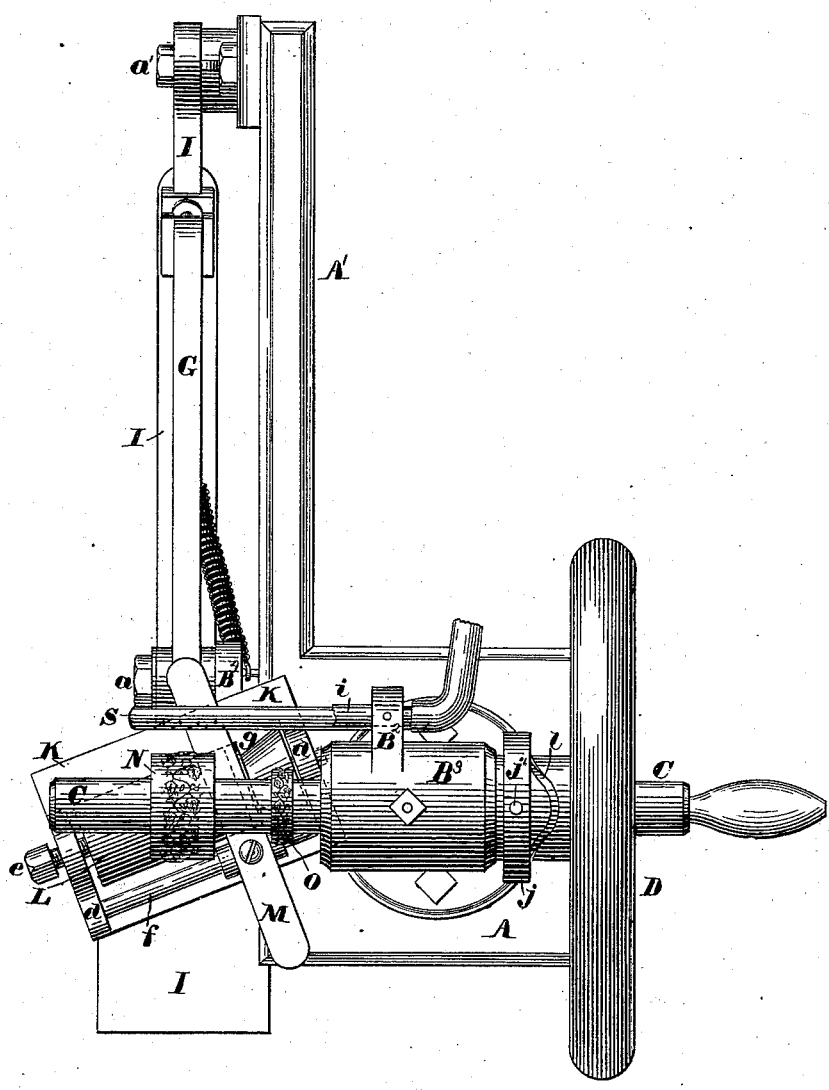

Figure 1 of the drawings is a front elevation of a machine embodying my invention. Fig. 2 is a side elevation with the treadle broken away. Fig. 3 is a partial vertical section on line $xx$ on Fig. 1. Fig. 4 is a plan with the size-rolls removed and the bed-roll adjusted to an oblique position relative to the axis of the die for the purpose of applying the ornamentation in a curved line, as will be more fully described. Fig. 5 is a side elevation of the base of the machine with the treadle attached. Fig. 6 is a horizontal section through the shank of the bed-roll carriage on line $yy$ on Figs. 1 and 2, looking upward; and Fig. 7 is a plan of the yoke for operating the distributing size-roll.

A is the base of the machine, designed to stand upon and be securely bolted to a bench or table, (not shown,) and from which rises the standard B, provided with the laterally-projecting arm B', the rearwardly-projecting ear-B², and the hub or boss B³, in which is formed a bearing for the shaft C, to one end of which is secured the hand-wheel or crank D, by which it may be revolved at will.

In the arm B' is formed a vertical bearing to receive the shank E' of the carriage E, so fitted thereto that it may be moved vertically therein and partially rotated about its axis. The lower end of the shank of the carriage E rests upon and is supported by the convex head of the screw F, adjustably set in the front end of the lever G, which is pivoted at $a$ to the arm B⁴, projecting from the side of the standard B, and is connected at its rear end, by the rod H, to the treadle I, which, in turn, is pivoted at $a'$ to the rear end of the arm A', projecting from the base A, and is held in the desired position by the spring J, as shown in Fig. 5.

In the upper side of the carriage E is formed a socket to receive the rounded pintle $b$ of the stand K, said pintle being made of considerably less diameter than the diameter of the socket, and being surrounded by the rubber tube $c$, which fills the space between said pintle and the walls of the socket, as shown in Fig. 3. The stand K has formed upon its upper surface the two ears $d\ d$, in which are set the screw-centers $e\ e$, upon which is mounted the bed-roll L, as shown. The ears $d\ d$ also form bearings for the rod $f$, upon which is adjustably mounted the gage M, in such a manner that it may be moved lengthwise of said rod and secured in any desired position thereon.

The bed-roll L is composed of a metallic shaft having an enlargement at its inner end, and a rubber cylinder covering said shaft at the other end, and firmly secured thereto so as to revolve therewith. A portion of the roll L is made in the form of a frustum of a cone, or has formed thereon a circumferential groove having an inclined bottom, as shown at $g$ in Fig. 1, for the purpose of supporting a strip of material that is thicker at one edge than at the other while an ornamental design is being embossed thereon in a well-known manner.

The stand K is kept from moving about the axis of the pintle $b$ by the pin $h$, set in the carriage E and projecting upward into a hole formed in the stand K, as shown in Fig. 1, where a portion of the stand K is cut in section in order to show the arrangement of said pin.

N is a cylindrical die, having formed upon its peripheral surface any desired design in relief, and adjustably mounted upon the shaft C directly over the bed-roll L.

O is another cylindrical die, also adjustably mounted upon the shaft C in a position to cooperate with the conical portion of the bed-roll L, for embossing picture-moldings or other strips that are considerably thicker at one edge than at the other.

P is a frame pivoted to the ear B², and adapted to be clamped thereto in any desired position by means of the bolt $i$ and thumb-nut $i'$, and carrying the sizing-cylinder Q, size-roll $Q'$, and distributing-roll $Q^2$, arranged one above the other in the order named. The shaft $Q^3$ of the distributing-roll $Q^2$ is provided at one end with the slotted yoke R, which engages with the rod $j'$, which projects upward from the ring $j$ surrounding the hub D' of the wheel D, and connected therewith by means of the screw $k$, the point of which engages with the cam-groove $l$ formed in the periphery of said hub, as shown, so that a rotation of the hub D' causes the ring $j$ and rod $j'$ to move toward and from the wheel D, said ring being prevented from moving about the axis of the shaft C by the pin $m$, set in the standard B and passing through a hole in said ring. The distributing-roll $Q^2$ is so mounted upon its shaft that it may revolve freely thereon, while at the same time it must partake of the endwise motions of said shaft.

Rotary motion is imparted to the size-cylinder Q by frictional contact with the die-cylinder, and the rolls Q' and $Q^2$ are made to revolve by frictional contact with each other and with the size-cylinder Q, the adhesive nature of the size used rendering gearing unnecessary.

The form of the frame P is such that when it is not desired to apply the size the size-cylinder may be moved away from the die-cylinder by loosening the thumb-nut $i'$, moving the top of the frame P backward, and then screwing up the nut $i'$ again to clamp the frame P in the new position.

S is a gas-burner, by means of which the die may be heated when it is desired to apply gold-leaf to the design.

The carriage E has set therein two set-screws, $n\,n$, which may be so adjusted as to bear against the under side of the stand K, so as to maintain the bed-roll in a horizontal position for certain kinds of work.

If it is desired to form a sunken design in wood to be covered with metallic bronze, the size-rolls are coated with size and are placed in the position shown in the drawings, with the size-cylinder resting upon the die-cylinder, and the screw F is adjusted so that the distance between the upper surface of the bed-roll L and the under surface of the die shall be a little in excess of the thickness of the material to be acted upon. The material is then placed in position upon the bed-roll, with its edge against the gage M, and the operator places his foot upon the treadle I, and by depressing it raises the bed-roll L and the material resting thereon until the upper surface of the material is pressed hard against the die, when the die is revolved by means of the wheel or crank D, the revolution being continued until the whole design is formed upon the wood or other material, the surface of said design being coated with size deposited thereon by the die while making the impression, after which the bronze may be applied in the usual way. When the foot of the operator is removed from the treadle I its front end is moved upward by the reaction of the spring J, and the front end of the lever G, with the screw F, is depressed, and the carriage E, with the bed-roll L, is moved downward away from the die-cylinder by the force of gravity, assisted by the spring $o$, which surrounds the rod $p$ between its head $p'$ and the stud $q$, through which said rod passes, the upper end of said rod $p$ being set in the plate T, secured to the under side of the carriage E by the bolt $r$, which passes through the curved slot $r'$ formed in the plate T, and is screwed into the carriage E, as shown in Fig. 6.

If it is desired to put an ornamental border around the outer portion of a flat circular disk or curved piece of material, the bolt $r$ is slackened and the carriage E is turned about the axis of its shank to bring the axis of the bed-roll oblique to the axis of the die-cylinder, as shown in Fig. 4, the bolt $r$ moving along the slot $r'$ toward one end thereof. When the bed-roll L has been brought into the desired angular position the bolt $r$ is screwed up tight to clamp the carriage to the plate T and hold it firmly in such position, and the material is then placed in position on the bed-roll with its edge against the gage M, which may have been adjusted to suit the job in hand, and the operation is completed as before, the oblique position of the roll L relative to the die-cylinder causing the material to be fed through the machine in a curved line.

When it is desired to have the design covered with gold or other metallic leaf, the proper size for such work is applied to the surface of the material to be ornamented by a brush in the usual way, the leaf is placed thereon, the size-rolls are moved away from the die-cylinder, heat is applied to the die-cylinder by means of the gas-burner S, and then the material is placed in the desired position between the bed-roll and die-cylinder, pressure is applied, and the material is fed through the machine, as before stated.

Another application of even date herewith contains many of the parts here described; but I do not claim in this application anything that is claimed in said other application; but

What I claim as new, and desire to secure by Letters Patent of the United States, is—

1. The combination of the die-cylinder N, the bed-roll L, the tilting stand K, supported upon the central pintle, $b$, the carriage E, provided with the central shank, E', the lever G, adjustable operating-bolt F, and a treadle for operating said lever, all arranged and adapted to operate substantially as and for the purposes described.

2. The combination of the carriage E, provided with the vertical cylindrical shank E', the stand K, carrying the bed-roll L and supported by said carriage, the plate T, provided with the curved slot $r'$, the bolt $r$, the rod $p$, the spring $o$, and suitable sockets or bearings to receive the shank E' and the rod $p$, all arranged and adapted to operate substantially as and for the purposes described.

3. The combination of the carriage E, provided with the central vertical shank, E', and with a socket in its upper side, the stand K, provided with the convex-ended pintle $b$ and means of supporting a bed-roll thereon, and the ring $c$, of rubber or other elastic material, all arranged and adapted to operate substantially as and for the purposes described.

Executed at Boston, Massachusetts, this 29th day of April, A. D. 1881.

JOHN P. JAMISON.

Witnesses:
N. C. LOMBARD,
W. E. LOMBARD.